United States Patent
Komatsubara et al.

(10) Patent No.: US 10,753,395 B2
(45) Date of Patent: Aug. 25, 2020

(54) OIL-IMPREGNATED SINTERED BEARING AND METHOD FOR MANUFACTURING SAME

(71) Applicant: NTN CORPORATION, Osaka (JP)

(72) Inventors: Shinji Komatsubara, Mie (JP); Yoshinori Ito, Aichi (JP); Tadahiro Uchiyama, Aichi (JP)

(73) Assignee: NTN CORPORATION, Osaka (JP)

( * ) Notice: Subject to any disclaimer, the term of this patent is extended or adjusted under 35 U.S.C. 154(b) by 92 days.

(21) Appl. No.: 16/078,752

(22) PCT Filed: Jan. 27, 2017

(86) PCT No.: PCT/JP2017/003072
§ 371 (c)(1),
(2) Date: Aug. 22, 2018

(87) PCT Pub. No.: WO2017/145648
PCT Pub. Date: Aug. 31, 2017

(65) Prior Publication Data
US 2019/0055986 A1 Feb. 21, 2019

(30) Foreign Application Priority Data

Feb. 25, 2016 (JP) .................................. 2016-034473

(51) Int. Cl.
*F16C 33/12* (2006.01)
*B22F 3/16* (2006.01)
(Continued)

(52) U.S. Cl.
CPC .............. *F16C 33/121* (2013.01); *B22F 1/00* (2013.01); *B22F 3/16* (2013.01); *B22F 3/24* (2013.01);
(Continued)

(58) Field of Classification Search
CPC ...... F16C 17/10; F16C 17/102; F16C 17/107; F16C 3/10; F16C 33/104; F16C 33/128;
(Continued)

(56) References Cited

U.S. PATENT DOCUMENTS 6,338,747 B1 * 1/2002 Kosco ..................... C22C 33/02
419/11
8,167,971 B2 * 5/2012 Shimizu .................. B22F 5/106
75/230
(Continued)

FOREIGN PATENT DOCUMENTS

| GB | 2509393 A | * | 7/2014 | ............ F16C 33/128 |
| JP | 10-306827 | | 11/1998 | |

(Continued)

OTHER PUBLICATIONS

International Search Report dated Apr. 25, 2017 in International (PCT) Application No. PCT/JP2017/003072.
(Continued)

*Primary Examiner* — Marcus Charles
(74) *Attorney, Agent, or Firm* — Wenderoth, Lind & Ponack, L.L.P.

(57) ABSTRACT

An oil-impregnated sintered bearing (8) includes a copper-iron-based sintered compact containing 40 mass % or more of copper, and has inner pores impregnated with an oil. The sintered compact has: a copper structure derived from copper powder (13) of partially diffusion-alloyed powder (11) in which copper powder (13) having a particle diameter of 20 μm or less is diffused on and joined to a surface of iron powder (12) in advance; and a copper structure derived from elemental copper powder (14).

15 Claims, 4 Drawing Sheets

(51) Int. Cl.
| | |
|---|---|
| *B22F 3/24* | (2006.01) |
| *B22F 5/10* | (2006.01) |
| *H02K 5/167* | (2006.01) |
| *H02K 7/08* | (2006.01) |
| *H02K 21/22* | (2006.01) |
| *G11B 19/20* | (2006.01) |
| *F16C 17/10* | (2006.01) |
| *F16C 33/14* | (2006.01) |
| *F16C 33/10* | (2006.01) |
| *B22F 5/00* | (2006.01) |
| *C22C 9/00* | (2006.01) |
| *B22F 1/00* | (2006.01) |
| *C22C 38/00* | (2006.01) |

(52) U.S. Cl.
CPC ............... *B22F 5/00* (2013.01); *B22F 5/106* (2013.01); *C22C 9/00* (2013.01); *C22C 38/00* (2013.01); *F16C 17/10* (2013.01); *F16C 33/10* (2013.01); *F16C 33/104* (2013.01); *F16C 33/128* (2013.01); *F16C 33/145* (2013.01); *G11B 19/2036* (2013.01); *H02K 5/1677* (2013.01); *H02K 7/086* (2013.01); *H02K 21/22* (2013.01); *B22F 2301/10* (2013.01); *B22F 2301/35* (2013.01); *B22F 2304/10* (2013.01); *F16C 17/107* (2013.01); *F16C 2204/10* (2013.01); *F16C 2204/60* (2013.01); *F16C 2220/20* (2013.01); *F16C 2223/04* (2013.01); *F16C 2240/48* (2013.01); *F16C 2370/12* (2013.01); *H02K 2205/03* (2013.01)

(58) Field of Classification Search
CPC .................................................. F16C 33/145;
F16C 2204/10; F16C 2204/60; F16C 2220/60; F16C 2220/20; F16C 2223/04; F16C 2370/12; G11B 19/2036; H02K 5/1677; H02K 7/086; H02K 21/22; H02K 2205/03; B22F 2301/10; B22F 2301/35; B22F 2304/10; B22F 1/007; Y10T 428/12042; Y10T 428/12028
USPC ....... 384/100, 107, 114, 121, 123, 279, 902, 384/910, 625; 75/228, 246, 751; 419/2, 419/23, 28, 38, 27

See application file for complete search history.

(56) References Cited

U.S. PATENT DOCUMENTS

| | | | | |
|---|---|---|---|---|
| 2004/0112172 | A1* | 6/2004 | Shimizu | F16C 17/045 |
| | | | | 75/228 |
| 2004/0213692 | A1* | 10/2004 | Ishijima | B22F 1/0003 |
| | | | | 419/32 |
| 2007/0271789 | A1* | 11/2007 | Kondo | B21K 1/30 |
| | | | | 29/893 |
| 2010/0310199 | A1* | 12/2010 | Okamura | B22F 3/164 |
| | | | | 384/114 |
| 2013/0071054 | A1* | 3/2013 | Harada | F16C 33/1065 |
| | | | | 384/107 |
| 2013/0101244 | A1* | 4/2013 | Nishizawa | C22C 9/00 |
| | | | | 384/279 |
| 2013/0336604 | A1* | 12/2013 | Noda | F16C 32/0633 |
| | | | | 384/107 |
| 2014/0234152 | A1* | 8/2014 | Ito | B22F 3/02 |
| | | | | 419/11 |
| 2015/0043844 | A1 | 2/2015 | Hori et al. | |
| 2015/0064045 | A1* | 3/2015 | Jinnou | F16C 33/145 |
| | | | | 419/11 |
| 2016/0138651 | A1 | 5/2016 | Kurimura et al. | |
| 2016/0215820 | A1* | 7/2016 | Sugai | B22F 7/06 |
| 2016/0223016 | A1 | 8/2016 | Ito et al. | |

FOREIGN PATENT DOCUMENTS

| | | | | |
|---|---|---|---|---|
| JP | 2001-279349 | | 10/2001 | |
| JP | 2003184882 | A * | 7/2003 | ............ F16C 33/12 |
| JP | 2004084038 | A * | 3/2004 | ............ B22F 1/0011 |
| JP | 2013-204072 | | 10/2013 | |
| JP | 2015-21586 | | 2/2015 | |
| JP | 2015-137660 | | 7/2015 | |
| JP | 2016141815 | A * | 8/2016 | ............ F16C 33/12 |
| JP | 6038460 | B2 * | 12/2016 | ............ F16C 33/14 |
| WO | WO-2016147796 | A1 * | 9/2016 | ............... B22F 3/11 |

OTHER PUBLICATIONS

Extended European Search Report dated Oct. 15, 2019 in corresponding European Patent Application No. 17756090.1.
International Preliminary Report on Patentability and Written Opinion of the International Searching Authority dated Aug. 28, 2018 in International (PCT) Application No. PCT/JP2017/003072.

* cited by examiner

OIL-IMPREGNATED SINTERED BEARING AND METHOD FOR MANUFACTURING SAME

This application is a U.S. National Stage Application of International (PCT) Application No. PCT/JP2017/003072, filed on Jan. 27, 2017.

TECHNICAL FIELD

The present invention relates to an oil-impregnated sintered bearing, and more specifically, to an oil-impregnated sintered bearing to be incorporated in a fluid dynamic bearing device.

BACKGROUND ART

A fluid dynamic bearing device is configured to increase the pressure of a lubricating oil filled in a radial bearing gap between: an outer peripheral surface of a shaft member inserted along an inner periphery of a bearing member; and an inner peripheral surface of the bearing member through relative rotation of the bearing member and the shaft member, to thereby relatively rotatably support the shaft member in a non-contact manner with the pressure (dynamic pressure generating action). The fluid dynamic bearing device is suitably used for, for example, a spindle motor for a disk drive, such as an HDD, by virtue of having characteristics of excellent rotational accuracy and excellent quietness.

An oil-impregnated sintered bearing obtained by impregnating an oil into inner pores of a sintered compact is used as the bearing member to be incorporated in the fluid dynamic bearing device in some cases. However, the oil-impregnated sintered bearing has innumerable minute openings on a surface thereof, and hence when the pressure of the lubricating oil filled in the radial bearing gap is increased, there is a risk in that the lubricating oil penetrates into the inner pores from the openings on an inner peripheral surface of the oil-impregnated sintered bearing, and the pressure (oil film strength) of the lubricating oil in the radial bearing gap is reduced. Such phenomenon is called "dynamic pressure absence," and is considered as a problem to be avoided in the fluid dynamic bearing device using the oil-impregnated sintered bearing.

As a measure for preventing the dynamic pressure absence, a method involving subjecting an inner peripheral surface of a sintered compact to rotation sizing to reduce surface openings has been known (for example, see Patent Literature 1 below).

CITATION LIST

Patent Literature 1: JP 10-306827 A

SUMMARY OF INVENTION

Technical Problem

The rotation sizing is a processing method involving press-fitting a sizing pin having a substantially polygonal cross section to an inner peripheral surface of a sintered compact, and rotating the sizing pin, to thereby crush surface openings on the inner peripheral surface. In order to sufficiently reduce a surface opening ratio on a bearing surface through the rotation sizing and obtain oil film strength required for a dynamic bearing, a material of a surface layer of the sintered compact needs to be extended by press sufficiently. For example, when an oil-impregnated sintered dynamic bearing is formed of a copper-iron-based sintered compact, a surface layer of the sintered compact can be increased in extendability through the rotation sizing by increasing the content of copper, which is relatively soft and easily extended by press.

However, according to investigations made by the inventors of the present invention, even when the sintered compact is produced through use of raw material powder containing copper powder at a high ratio (e.g., 50 mass % or more) and an inner peripheral surface (bearing surface) thereof is subjected to the rotation sizing, coarse pores remain on the bearing surface in some cases. It cannot be said that a reduction in oil film strength owing to dynamic pressure absence can be certainly prevented.

An object of the present invention is to prevent formation of coarse pores on a bearing surface of an oil-impregnated sintered bearing, and thus certainly prevent a reduction in oil film strength owing to dynamic pressure absence.

Solution to Problem

In order to achieve the above-mentioned object, according to one embodiment of the present invention, there is provided an oil-impregnated sintered bearing, comprising a copper-iron-based sintered compact containing 40 mass % or more of copper, wherein the sintered compact has: a copper structure derived from copper powder of partially diffusion-alloyed powder in which copper powder having a particle diameter of 20 μm or less is diffused on and joined to a surface of iron powder in advance; and a copper structure derived from elemental copper powder.

The oil-impregnated sintered bearing may be produced through the steps of: mixing partially diffusion-alloyed powder in which copper powder having a particle diameter of 20 μm or less is diffused on and joined to a surface of iron powder and elemental copper powder to produce raw material powder; compression-molding the raw material powder to provide a green compact; sintering the green compact to provide a sintered compact; subjecting an inner peripheral surface of the sintered compact to sealing treatment by extending a material of a surface layer on the inner peripheral surface by press; and impregnating inner pores of the sintered compact with an oil.

The inventors of the present invention have investigated the structure of a related-art copper-iron-based oil-impregnated sintered bearing, and as a result, have found that coarse pores are generated mainly around iron powder having an irregular shape. In view of the foregoing, in the present invention, the oil-impregnated sintered bearing is formed through use of the partially diffusion-alloyed powder in which fine copper powder (specifically, the copper powder having a particle diameter of 20 μm or less) is diffused on and joined to the surface of the iron powder. The partially diffusion-alloyed powder is produced by heating the iron powder and the copper powder under a state in which the powders are mixed with each other. At this time, the fine copper powder easily adheres to the iron powder having an irregular shape under a state of entering a recessed portion of the iron powder, and hence the irregular shape is alleviated in the entirety of the partially diffusion-alloyed powder. As a result, the formation of the coarse pores resulting from the iron powder having an irregular shape is suppressed.

Incidentally, it may be considered that, even in the case where the raw material powder contains the iron powder having an irregular shape, when the elemental copper powder to be mixed with the iron powder is fine, the fine elemental copper powder enters the recessed portion of the iron powder having an irregular shape and the formation of the coarse pores can be prevented. However, the sintered compact contains copper at a high ratio (40 mass % or more), and in turn, the raw material powder contains the fine elemental copper powder in a large amount. As a result, the fluidity of the raw material powder is reduced, and there is a risk in that compression molding (forming) of the raw material powder becomes difficult. Meanwhile, when the partially diffusion-alloyed powder is used as described above, the fine copper powder is blended in the raw material powder under a state of adhering to the iron powder in advance. Therefore, the fluidity of the raw material powder is not reduced, and the compression molding is not adversely affected.

In the production of the partially diffusion-alloyed powder, the amount of the copper powder which can adhere to the surface of the iron powder is limited. Therefore, the ratio of the copper powder in the partially diffusion-alloyed powder is generally from about 15 mass % to about 30 mass %. Therefore, in order to increase the ratio of copper in the sintered compact up to 40 mass % or more, it is preferred to blend the elemental copper powder at a high ratio (e.g., 35 mass % or more in the entirety of the sintered compact). In this case, when the elemental copper powder has an excessively large particle diameter, the coarse pores are liable to be formed. Therefore, the elemental copper powder to be used preferably has a small particle diameter (specifically, 63 μm or less), and more preferably has a particle diameter of 45 μm or less.

Electrolytic copper powder is preferably used as the elemental copper powder. Particles of the electrolytic copper powder have dendritic shapes, and hence the powders easily tangle with each other through the compression molding. When the sintering is performed under such state, the sintering easily proceeds, and hence the strength of the sintered compact is increased, and inner pores of the sintered compact can be reduced in size.

The sintered compact may have formed, on an inner peripheral surface or an end surface thereof, a dynamic pressure generating portion (e.g., a dynamic pressure generating groove) configured to positively cause a dynamic pressure generating action on a lubricating oil filled in a bearing gap. In this case, the pressure of the lubricating oil in the bearing gap is further increased, and hence the prevention of the dynamic pressure absence through suppression of the formation of the coarse pores as described above is particularly effective.

A fluid dynamic bearing device comprising the oil-impregnated sintered bearing, a shaft member inserted along an inner periphery of the oil-impregnated sintered bearing, and a radial bearing portion configured to support the shaft member in a non-contact manner in a radial direction with a pressure of an oil film to be generated in a radial bearing gap between an inner peripheral surface of the oil-impregnated sintered bearing and an outer peripheral surface of the shaft member has high oil film strength, and hence has excellent rotation accuracy.

Advantageous Effects of Invention

As described above, according to the present invention, the formation of the coarse pores on the bearing surface resulting from the iron powder having an irregular shape can be prevented, and hence a reduction in oil film strength owing to the dynamic pressure absence can be certainly prevented.

DESCRIPTION OF EMBODIMENTS

Figure 1:
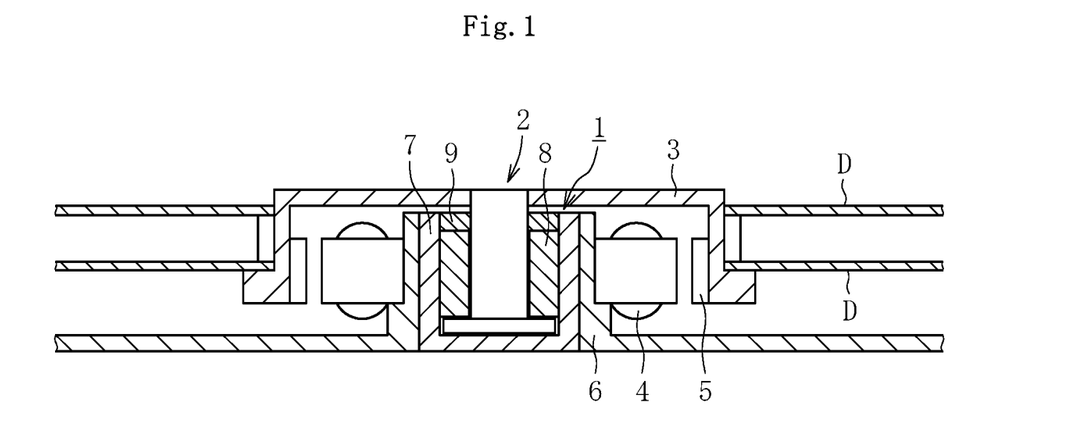
FIG. 1 is a sectional view of a spindle motor.

A spindle motor to be used for a disk drive, such as an HDD, is illustrated in FIG. 1. The spindle motor comprises a fluid dynamic bearing device 1, a disk hub 3 fixed to a shaft member 2 of the fluid dynamic bearing device 1, a stator coil 4 and a rotor magnet 5 opposed to each other through intermediation of a radial gap, and a bracket 6. The stator coil 4 is fixed to the bracket 6, and the rotor magnet 5 is fixed to the disk hub 3. A housing 7 of the fluid dynamic bearing device 1 is fixed on an inner peripheral surface of the bracket 6. The disk hub 3 holds a predetermined number of disks D (two disks in the illustrated example). When the stator coil 4 is energized, the rotor magnet 5 is rotated, thereby causing the disks D held on the disk hub 3 to rotate integrally with the shaft member 2.

Figure 2:
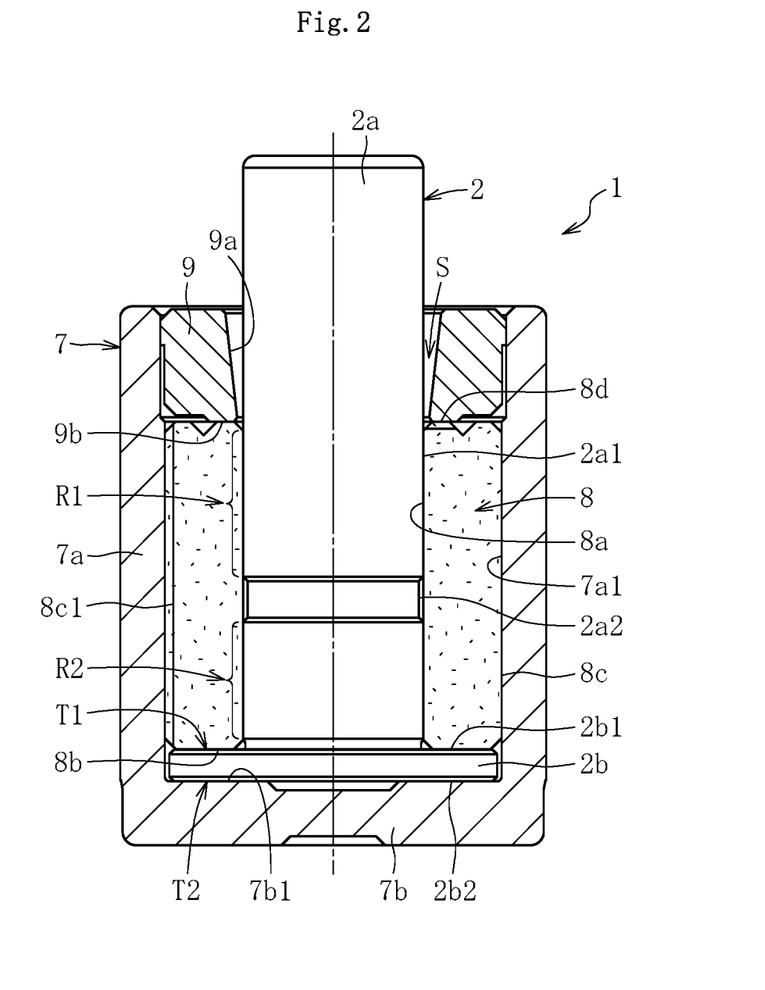
FIG. 2 is a sectional view of a fluid dynamic bearing device.

As illustrated in FIG. 2, the fluid dynamic bearing device 1 comprises an oil-impregnated sintered bearing 8 according to an embodiment of the present invention, the shaft member 2 inserted along an inner periphery of the oil-impregnated sintered bearing 8, the bottomed cylindrical housing 7 having the oil-impregnated sintered bearing 8 fixed on an inner peripheral surface thereof, and a sealing member 9 arranged in an opening of the housing 7. In the following description of the fluid dynamic bearing device 1, for convenience, the opening side of the housing 7 in an axial direction is called an upper side, and a side opposite thereto is called a lower side.

The shaft member 2 is formed of a metal material, such as stainless steel, and comprises a shaft portion 2a and a flange portion 2b formed on a lower end of the shaft portion 2a. The shaft portion 2a has a cylindrical outer peripheral surface 2a1, and has formed, in an intermediate portion in its axial direction, a relief portion 2a2 having a smaller diameter than other regions. The outer diameter of the shaft portion 2a is set to, for example, from about 0.5 mm to about 4 mm.

Figure 3:
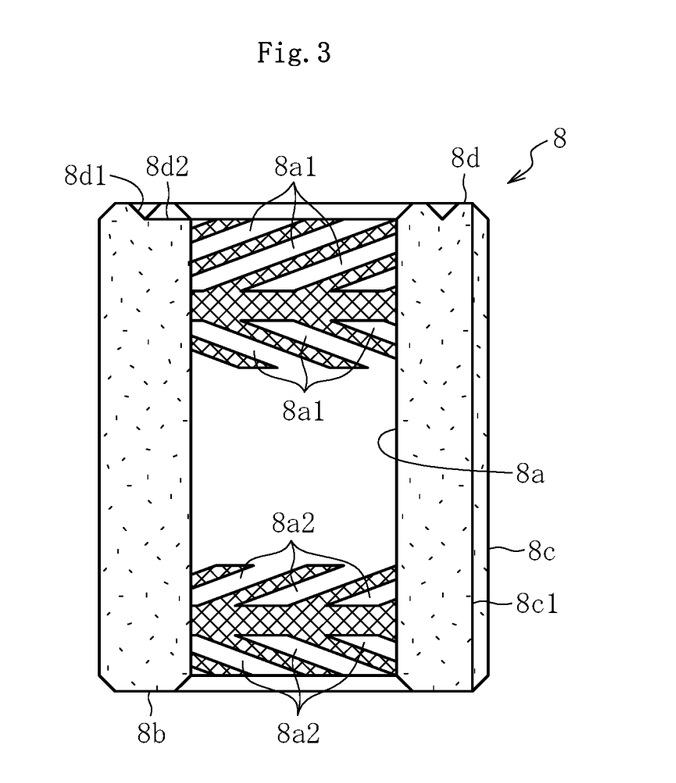
FIG. 3 is a sectional view of an oil-impregnated sintered bearing according to an embodiment of the present invention.

The oil-impregnated sintered bearing 8 is formed of a copper-iron-based sintered compact containing copper and iron as main components. The oil-impregnated sintered bearing 8 has a cylindrical shape, and a radial bearing surface is formed on an inner peripheral surface 8a thereof. In this embodiment, as illustrated in FIG. 3, two radial bearing surfaces separate from each other in the axial direction are formed on the inner peripheral surface 8a of the oil-impregnated sintered bearing 8, and dynamic pressure generating grooves 8a1 and 8a2 each having a herringbone pattern are arranged as dynamic pressure generating portions on the radial bearing surfaces. A region represented by cross hatching in the figure represents a hill portion which protrudes on a radially inner side. The dynamic pressure generating groove 8a1 on an upper side has an asymmetric form in the axial direction, and the dynamic pressure generating groove 8a2 on a lower side has a symmetric form in the axial direction. When the shaft member 2 is rotated, a lubricating oil in a radial bearing gap is force-fed in the axial direction with the dynamic pressure generating groove 8a1 on the upper side having an asymmetric form in the axial direction. With this, the lubricating oil is forcibly circulated in the housing 7. Both the upper and lower dynamic pressure generating grooves 8a1 and 8a2 may have symmetric forms in the axial direction. In addition, the upper and lower dynamic pressure generating grooves 8a1 and 8a2 may be arranged continuously in the axial direction, or any one or both of the upper and lower dynamic pressure generating grooves 8a1 and 8a2 may be omitted.

Figure 4:
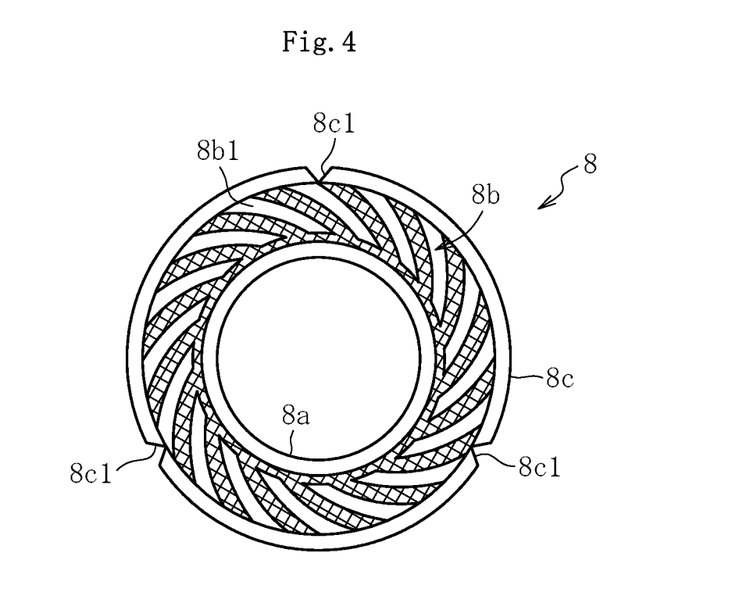
FIG. 4 is a bottom view of the oil-impregnated sintered bearing.

A thrust bearing surface is formed on a lower end surface 8b of the oil-impregnated sintered bearing 8. Dynamic pressure generating grooves 8b1 having a spiral pattern as illustrated in FIG. 4 are formed as dynamic pressure generating portions on the thrust bearing surface. The dynamic pressure generating grooves 8b1 in the illustrated example are of a pump-in type of force-feeding a lubricating oil to the radially inner side along with rotation of the shaft member 2. As illustrated in FIG. 3, an annular groove 8d1 and a plurality of radial grooves 8d2 formed on the radially inner side with respect to the annular groove 8d1 are formed in an upper end surface 8d of the oil-impregnated sintered bearing 8. A plurality of axial grooves 8c1 are equiangularly arranged on an outer peripheral surface 8c of the oil-impregnated sintered bearing 8. When a space on a radially outer side of the flange portion 2b of the shaft member 2 is communicated to a seal space S through those axial grooves 8c1, annular groove 8d1, radial grooves 8d2, and the like, the generation of a negative pressure is prevented in the space.

The housing 7 has a cylindrical side 7a and a disc-like bottom 7b closing a lower opening of the side 7a (see FIG. 2). The housing 7 is formed of a resin or a metal. In the illustrated example, the side 7a and the bottom 7b are integrally formed through injection molding with a resin. Pump-in type dynamic pressure generating grooves having a spiral pattern are formed in an upper end surface 7b1 of the bottom 7b as thrust dynamic pressure generating portions (not shown). The dynamic pressure generating grooves may be formed simultaneously with, for example, injection molding for the housing 7. The side 7a and the bottom 7b of the housing 7 may be formed with separate bodies.

The sealing member 9 is formed of a resin or a metal, and is formed into an annular shape. The sealing member 9 is fixed on an upper end of an inner peripheral surface 7a1 of the side 7a of the housing 7 (see FIG. 2). A lower end surface 9b of the sealing member 9 is held in abutment against the upper end surface 8d of the oil-impregnated sintered bearing 8. An inner peripheral surface 9a of the sealing member 9 has a tapered shape having a diameter gradually reduced toward a lower side. The inner peripheral surface 9a of the sealing member 9 is opposed to an outer peripheral surface 2a1 of the shaft portion 2a in the radial direction, and a wedge-like seal space S having a radial dimension gradually reduced toward the lower side is formed between the inner peripheral surface 9a and the outer peripheral surface 2a1. During the rotation of the shaft member 2, the seal space S serves as a capillary-force seal, thereby preventing a lubricating oil filled in the housing 7 from leaking out.

The lubricating oil is injected into the fluid dynamic bearing device 1 comprising the above-mentioned components. With this, an internal space of the fluid dynamic bearing device 1 including inner pores of the oil-impregnated sintered bearing 8 is filled with the lubricating oil, and an oil surface is always maintained within the seal space S.

When the shaft member 2 is rotated, a radial bearing gap is formed between the inner peripheral surface 8a of the oil-impregnated sintered bearing 8 and the outer peripheral surface 2a1 of the shaft portion 2a. Further, a pressure of an oil film in the radial bearing gap is increased by the dynamic pressure generating grooves 8a1 and 8a2 formed in the inner peripheral surface 8a of the oil-impregnated sintered bearing 8. Owing to this dynamic pressure generating action, there are formed a first radial bearing portion R1 and a second radial bearing portion R2 configured to rotatably support the shaft member 2 in a non-contact manner.

At the same time, thrust bearing gaps are formed between an upper end surface 2b1 of the flange portion 2b and the lower end surface 8b of the oil-impregnated sintered bearing 8, and between a lower end surface 2b2 of the flange portion 2b and the upper end surface 7b1 of the bottom 7b of the housing 7. Further, the pressure of the oil film in each of the thrust bearing gaps is increased by the dynamic pressure generating grooves 8b1 formed in the lower end surface 8b of the oil-impregnated sintered bearing 8 and the dynamic pressure generating grooves formed in the upper end surface 7b1 of the bottom 7b of the housing 7. Thus, there are formed a first thrust bearing portion T1 and a second thrust bearing portion T2 configured to rotatably support the shaft member 2 in both thrust directions in a non-contact manner.

Now, a method of manufacturing the oil-impregnated sintered bearing 8 described above is described. The oil-impregnated sintered bearing 8 is manufactured mainly through (A) a raw material powder mixing step, (B) a molding step, (C) a sintering step, (D) a sealing treatment step, and (E) a dynamic pressure generating groove forming step, in the stated order. The steps are described in detail below.

(A) Raw Material Powder Mixing Step

In this step, a plurality of kinds of powders described below are mixed to produce raw material powder for the oil-impregnated sintered bearing 8. The raw material powder to be used in this embodiment comprises partially diffusion-alloyed powder, elemental copper powder, and low-melting point metal powder. For example, various molding lubricants (e.g., a lubricant for improving mold releasability) or solid lubricants (e.g., graphite powder) may be added to the raw material powder as required. The powders described above are described in detail below.

Partially Diffusion-Alloyed Powder

Figure 5A:
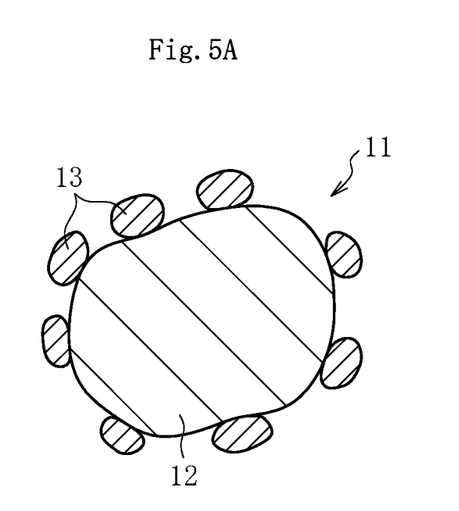
FIG. 5a is a sectional view for schematically illustrating partially diffusion-alloyed powder.
Figure 5B:
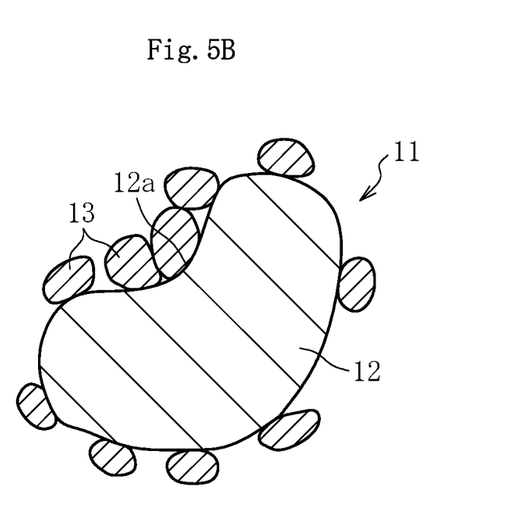
FIG. 5b is a sectional view for schematically illustrating the partially diffusion-alloyed powder.

An Fe—Cu partially diffusion-alloyed powder in which copper powder 13 is diffused on and joined to the surface of iron powder 12 is used as partially diffusion-alloyed powder 11. In particular, as schematically illustrated in FIG. 5a and FIG. 5b, Fe—Cu partially diffusion-alloyed powder in which a number of particles of the copper powder 13 having an average particle diameter smaller than that of the iron powder 12 are diffused on and joined to the surface of the iron powder 12 is used in this embodiment. Around a boundary between the iron powder 12 and the copper powder 13 of the partially diffusion-alloyed powder 11, copper is diffused on iron to form an Fe—Cu alloy. The partially diffusion-alloyed powder 11 is formed by heating mixed powder of the iron powder 12 and the copper powder 13 to allow the copper powder 13 to be diffused on and joined to the iron powder 12, followed by pulverization. At this time, for example, in iron powder 12 having an irregular shape as illustrated in FIG. 5B, the fine copper powder 13 easily fits in a recessed portion 12a of such iron powder 12, and is diffused thereon and joined thereto under this state. With this, a state in which the recessed portion 12a of the iron powder 12 is filled with the fine copper powder 13 is achieved, and hence the irregular shape is alleviated to some extent.

When the partially diffusion-alloyed powder 11 has an excessively large particle diameter, there is a risk in that coarse pores are formed between particles of the partially diffusion-alloyed powder 11. Therefore, the partially diffusion-alloyed powder 11 to be used preferably has a particle diameter of 106 µm or less. In addition, from the viewpoint of ensuring fluidity of the raw material powder, the partially diffusion-alloyed powder 11 to be used desirably does not contain 25 mass % or more of particles each having a particle diameter of 45 µm or less.

As the iron powder 12 constituting the partially diffusion-alloyed powder 11, reduced iron powder, atomized iron powder, or other known iron powders may be used. In this embodiment, the reduced iron powder is used. The reduced iron powder has a substantially spherical but irregular shape. Further, the reduced iron powder has a sponge-like shape (porous shape) having inner pores, and hence is also called sponge iron powder. The iron powder 12 to be used has a particle diameter of preferably from 20 µm to 106 µm, more preferably from 38 µm to 75 µm.

In addition, as the copper powder 13 constituting the partially diffusion-alloyed powder 11, generally-used irregular or dendritic copper powder may be used widely. For example, electrolytic copper powder, atomized copper powder, or the like is used. In this embodiment, the atomized copper powder, which has a number of irregularities on its surface, has a substantially spherical but irregular shape in the entirety of its particle, and is excellent in formability, is used. Meanwhile, when the electrolytic copper powder is used, the copper powder can be bonded to the iron powder 12 more strongly because the electrolytic copper powder is excellent in sintering property. The copper powder 13 to be used has a particle diameter smaller than that of the iron powder 12, specifically, a particle diameter of 20 µm or less. In addition, the copper powder 13 to be used desirably has a certain size in order to ensure its adhesion amount to the iron powder 12, and for example, has a particle diameter of 5 µm or more. The ratio of Cu in the partially diffusion-alloyed powder 11 is from 10 mass % to 30 mass % (preferably from 22 mass % to 26 mass %).

Elemental Copper Powder

As the elemental copper powder, both electrolytic copper powder and atomized copper powder may be used, but in particular, electrolytic copper powder is preferably used. This is because particles of the electrolytic copper powder have dendritic shapes, and hence the particles easily tangle with each other, with the result that the inner pores can be reduced in size. In addition, the elemental copper powder has a particle diameter of preferably 63 µm or less, more preferably 45 µm or less. With this, the pores formed between the particles are further reduced in size. In addition, from the viewpoint of ensuring fluidity of the raw material powder, the elemental copper powder to be used desirably does not contain 60 mass % or more of particles each having a particle diameter of 20 µm or less.

[Low-Melting Point Metal Powder]

As the low-melting point metal powder, metal powder having a melting point of 700° C. or less, such as powder containing tin, zinc, or phosphorus, is used. In this embodiment, of those powders, tin powder, which easily diffuses into copper and iron and may be used as elemental powder, in particular atomized tin powder, is used. As the tin powder (atomized tin powder), tin powder having a particle diameter of 63 µm or less is preferably used, and tin powder containing 90 mass % or more of particles each having a particle diameter of 45 µm or less is more preferably used.

The powders described above are mixed at a predetermined ratio. When the ratio of copper in the raw material powder is too low, the ratio of copper on the bearing surface of the oil-impregnated sintered bearing 8 becomes insufficient, and there is a risk in that a surface layer has insufficient extendability at the time of sealing treatment described below. Accordingly, the ratio of copper (the total of the copper powder of the partially diffusion-alloyed powder and the elemental copper powder) in the raw material powder is 40 mass % or more (preferably 50 mass % or more). Meanwhile, from the viewpoint of cost, the ratio of copper in the raw material powder is 75 mass % or less (preferably 65 mass % or less). In addition, when the ratio of iron in the raw material powder is too low, strength of the oil-impregnated sintered bearing 8 becomes insufficient, and when the ratio of iron in the raw material powder is too high, the ratio of copper is reduced and the above-mentioned inconvenience is caused. Accordingly, the blending ratio of iron (the iron powder of the partially diffusion-alloyed powder) in the raw material powder is 25 mass % or more (preferably 38 mass % or more) and 50 mass % or less (preferably 42 mass % or less). In this embodiment, the blending ratio of the partially diffusion-alloyed powder is set so that the ratio of the iron powder 12 is from 25 mass % to 50 mass % with respect to the entirety of the raw material powder. Meanwhile, the blending ratio of the elemental copper powder is from 35 mass % to 60 mass %.

When the blending ratio of the low-melting point metal powder is too low, liquid phase sintering proceeds insufficiently, which results in a reduction in strength. When the blending ratio of the low-melting point metal powder is too high, there is a problem in that the number of the coarse pores is increased. Therefore, the blending ratio of the low-melting point metal powder in the raw material powder is from 1 mass % to 3 mass %.

The particle diameters of the powders may each be measured by a laser diffraction scattering method (for example, using SALD-31000 manufactured by Shimadzu Corporation) involving radiating laser light to particles, and calculating a particle size distribution and the particle diameter from an intensity distribution pattern of diffracted/scattered light emitted therefrom, or by image analysis (for example, PITA-3 manufactured by Seishin Enterprise Co., Ltd.). In addition, the "particle diameter of X µm or less" as used herein means that particles each having a particle diameter of more than X μm are not substantially contained (3 mass % or more of the particles are not contained), and for example, means powder which can pass through a sieve having an opening of X μm. Similarly, the "particle diameter of Y μm or more" means that particles each having a particle diameter of less than Y μm are not substantially contained (3 mass % or more of the particles are not contained), and for example, means powder which remains on a sieve having an opening of Y μm without passing through the sieve.

(B) Molding Step

Figure 6A:
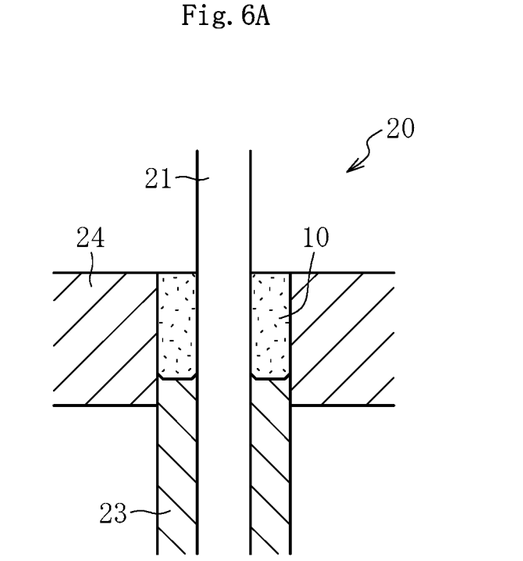
FIG. 6a is a sectional view for illustrating a compression molding step.
Figure 6B:
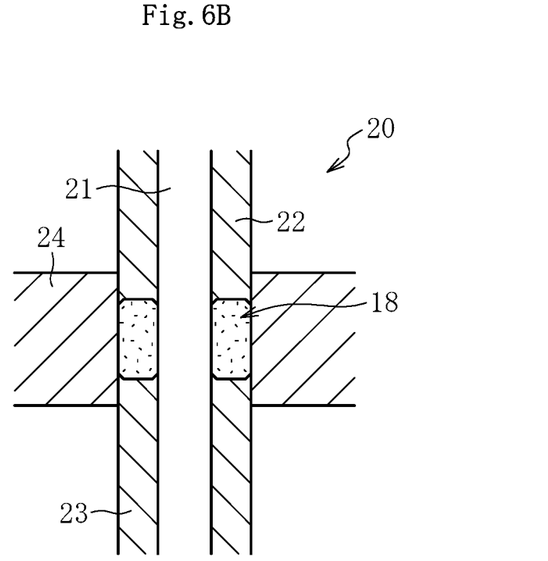
FIG. 6b is a sectional view for illustrating the compression molding step.

In the molding step, raw material powder 10 as described above is compressed through use of a mold 20 as illustrated in FIG. 6a and FIG. 6b to provide a green compact 18 having a shape close to that of the oil-impregnated sintered bearing 8 illustrated in FIG. 3 (substantially finished product shape). The mold 20 comprises, as main constituents, a core 21, upper and lower punches 22 and 23, and a die 24, which are arranged coaxially. For example, the mold 20 is set on a die set of a cam-type molding press machine.

First, the raw material powder 10 is loaded into a cavity defined by the core 21, the lower punch 23, and the die 24 (see FIG. 6a). After that, the upper punch 22 is moved downward to compress the raw material powder 10, to thereby form the green compact 18 (see FIG. 6b). Then, the upper punch 22 and the lower punch 23 are moved upward, and the green compact 18 is taken out of the cavity.

Figure 7:
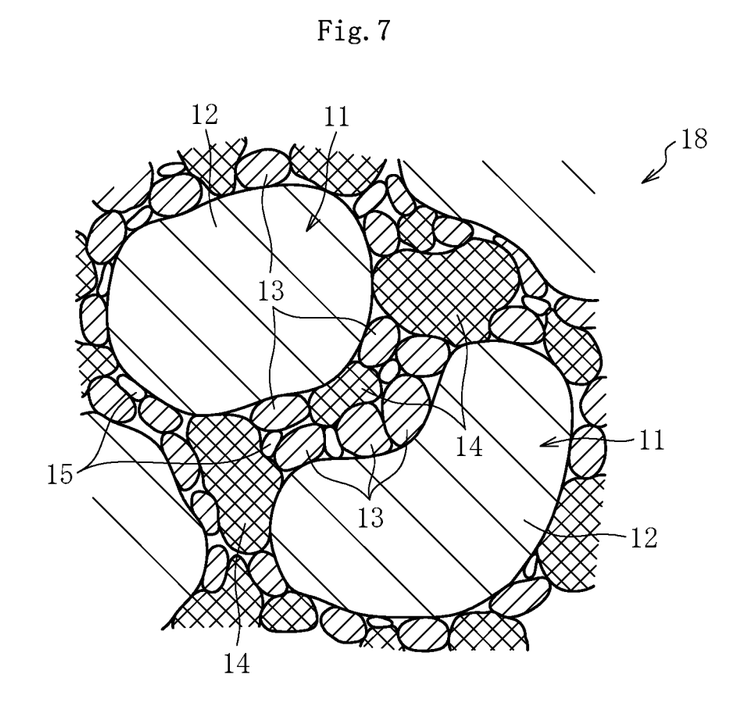
FIG. 7 is a sectional view for schematically illustrating a structure of a green compact.

The structure of the green compact 18 thus formed is illustrated in FIG. 7. In the structure, the iron powder 12 and the copper powder 13 constituting the partially diffusion-alloyed powder 11, elemental copper powder 14, and tin powder 15 are uniformly dispersed. The partially diffusion-alloyed powder 11 to be used in this embodiment contains the iron powder 12 having an irregular shape. However, the fine copper powder 13 enters the recessed portion 12a of the iron powder 12 to be joined thereto in advance, and hence the irregular shape is alleviated to some extent in the entirety (see FIG. 5b). Accordingly, the formation of the coarse pores resulting from the iron powder 12 having an irregular shape can be suppressed. In addition, the fine copper powder 13 having a particle diameter of 20 μm or less is mixed in the raw material powder under a state of being joined to the iron powder 12, and hence the fine copper powder 13 does not cause a reduction in fluidity of the raw material powder and segregation in the raw material powder.

In addition, in this embodiment, the raw material powder contains the copper powders 13 and 14, which are softer than the iron powder 12, at a relatively high ratio (40 mass % or more). With this, the pores formed between the particles can be filled by virtue of plastic flow of the copper powders 13 and 14 during compression molding. In addition, in this embodiment, the electrolytic copper powder having a small particle diameter (63 μm or less) is used as the elemental copper powder. With this, the pores formed between the particles can be reduced in size.

(C) Sintering Step

In the sintering step, the green compact 18 is sintered to provide a sintered compact. Specifically, the green compact 18 is heated at a temperature of 800° C. or more and 900° C. or less (low temperature sintering). When the raw material powder contains various molding lubricants, such as a fluid lubricant, the molding lubricants are vaporized along with the sintering. In this embodiment, the sintered compact has a density of from 6.3 g/cm$^3$ to 7.6 g/cm$^3$ (a relative density of from 74% to 90%).

The sintered compact produced through the above-mentioned step mainly has an iron structure and a copper structure. The copper structure is formed of a copper structure derived from the copper powder 13 of the partially diffusion-alloyed powder 11 and a copper structure derived from the elemental copper powder 14. Copper constituting those copper structures accounts for 40 mass % or more of the entirety of the sintered compact in terms of a total amount of the copper. Of those, the copper structure derived from the elemental copper powder 14 accounts for 35 mass % or more of the entirety of the sintered compact.

When coarse pores are not formed in a copper structure surrounding an iron structure of the sintered compact, it can be presumed that the raw material powder contains the Fe—Cu partially diffusion-alloyed powder. In addition, when a copper structure exists between iron structures relatively spaced apart from each other, it can be presumed that the raw material powder contains the elemental copper powder. Accordingly, when a cross section of the sintered compact is observed, and coarse pores are not formed in a copper structure surrounding an iron structure and a copper structure exists between iron structures relatively spaced apart from each other, it can be determined that the copper structure of the sintered compact includes both the copper structure derived from the copper powder 13 of the partially diffusion-alloyed powder 11 and the copper structure derived from the elemental copper powder 14.

(D) Sealing Treatment Step (Rotation Sizing Step)

In this step, a sizing pin having a substantially polygonal cross section is press-fitted to an inner peripheral surface of the sintered compact, and is rotated under this state (illustration is omitted). In the sizing pin, a corner to be brought into contact with the inner peripheral surface of the sintered compact is rounded into a shape having a substantially arc cross section. Through such rotation sizing, a material of the surface layer on the inner peripheral surface of the sintered compact is extended with the sizing pin. With this, openings on the inner peripheral surface are crushed, and a surface opening ratio on the inner peripheral surface is reduced. In particular, the sintered compact contains copper at a relatively high ratio, and hence the surface layer on the inner peripheral surface of the sintered compact has high extendability and the openings on the inner peripheral surface are easily crushed. With this, the opening ratio on the inner peripheral surface of the sintered compact can be reduced to 12% or less, preferably 10% or less. Meanwhile, the opening ratio on the inner peripheral surface of the sintered compact is desirably 0.1% or more.

Through sealing treatment, such as the rotation sizing as described above, the opening ratio on the inner peripheral surface of the sintered compact becomes smaller than an inner porosity (≈a porosity of the sintered compact in its entirety=100%−relative density). In other words, when the opening ratio on the inner peripheral surface of the sintered compact is equal to or smaller than the inner porosity, it can be presumed that the inner peripheral surface is subjected to the sealing treatment. The opening ratio on the inner peripheral surface of the sintered compact may be determined, for example, by analyzing a shot image of the inner peripheral surface of the sintered compact and calculating an area ratio of the openings.

(E) Dynamic Pressure Generating Groove Forming Step (Groove Sizing Step)

Figure 8A:
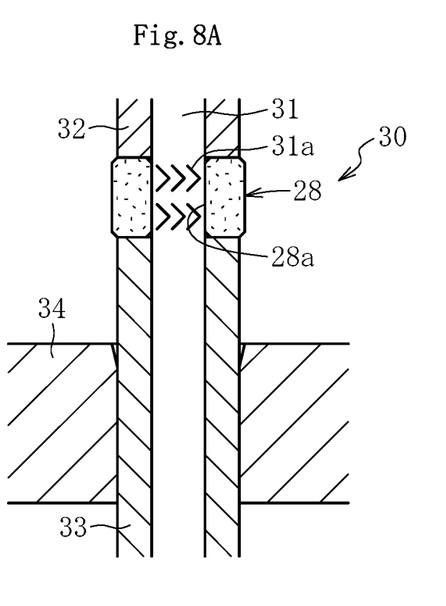
FIG. 8a is a sectional view for illustrating a groove forming step (groove sizing step).
Figure 8B:
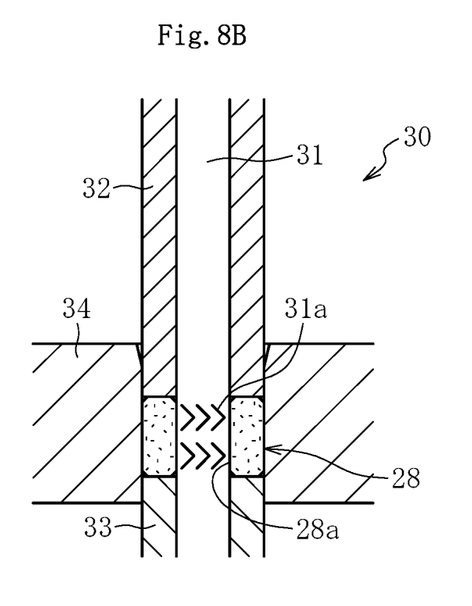
FIG. 8b is a sectional view for illustrating the groove forming step (groove sizing step).

In this step, a sintered compact 28 is corrected with predetermined dimensional accuracy with a sizing die 30 illustrated in FIG. 8, and the dynamic pressure generating grooves are formed on an inner peripheral surface 28a of the sintered compact 28 through die molding. Specifically, as illustrated in FIG. 8a, a core rod 31 is inserted along an inner periphery of the sintered compact 28 with a gap, and the width of the sintered compact 28 in an axial direction is captured with upper and lower punches 32 and 33. While this state is maintained, as illustrated in FIG. 8b, the sintered compact 28 is press-fitted to an inner periphery of a die 34. With this, the sintered compact 28 is compressed from an outer periphery thereof, and the inner peripheral surface 28a of the sintered compact 28 is pressed against forming patterns 31a formed on an outer peripheral surface of the core rod 31. Thus, the shapes of the forming patterns 31a are transferred to the inner peripheral surface 28a of the sintered compact 28, and the dynamic pressure generating grooves 8a1 and 8a2 are formed. After that, the sintered compact 28, the core rod 31, and the upper and lower punches 32 and 33 are moved upward, and the sintered compact 28 and the core rod 31 are taken out from the inner periphery of the die 34. At this time, the inner peripheral surface 28a of the sintered compact 28 is increased in diameter through spring back, and is released from the forming patterns 31a on the outer peripheral surface of the core rod 31. Then, the core rod 31 is pulled out from the inner periphery of the sintered compact 28.

When inner pores of the sintered compact 28 thus produced are impregnated with a lubricating oil by, for example, a vacuum impregnation method, the oil-impregnated sintered bearing 8 illustrated in FIG. 1 is completed.

The oil-impregnated sintered bearing according to the embodiment of the present invention has been described above, but the embodiment of the present invention is not limited to the above-mentioned one.

For example, in the compression molding step, there may be adopted a so-called warm molding method involving compression-molding the green compact 18 under a state in which at least one of the mold 20 or the raw material powder 10 is heated or a so-called molding method with mold lubrication involving compression-molding the green compact 18 under a state in which a lubricant is applied onto a molding surface (surface defining the cavity) of the mold 20. The green compact 18 can be formed with higher accuracy by adopting such methods.

In addition, in the sealing treatment step, any method involving extending by press (plastically deforming) the surface layer of the sintered compact to reduce the surface opening ratio may be adopted. Other than the rotation sizing, shot blasting, sand blasting, barrel polishing, tumbler treatment, or the like may also be adopted.

In addition, a dynamic pressure generating groove having a pattern other than the herringbone pattern may be formed on the inner peripheral surface 8a of the oil-impregnated sintered bearing 8. In addition, a dynamic pressure generating groove may be formed on the outer peripheral surface 2a1 of the shaft member 2 while the inner peripheral surface 8a of the oil-impregnated sintered bearing 8 is formed into a cylindrical surface. In addition, a so-called circular bearing in which both an inner peripheral surface 8a of a bearing sleeve 8 and an outer peripheral surface 2a1 of a shaft member 2 are formed into cylindrical surfaces, and a dynamic pressure is generated through whirling of the shaft member 2 may be formed.

In addition, the shaft member 2 may be supported in the thrust direction in a contact manner with a pivot bearing or the like, instead of being supported in a non-contact manner with a dynamic bearing (the thrust bearing portions T1 and T2) as described above. In this case, the thrust bearing surface is not formed on the end surface of the oil-impregnated sintered bearing 8.

In addition, in the above-mentioned embodiment, the case in which the oil-impregnated sintered bearing 8 is fixed and the shaft member 2 is rotated is described, but the present invention is not limited thereto. A configuration in which the shaft member 2 is fixed and the oil-impregnated sintered bearing 8 is rotated or a configuration in which both the shaft member 2 and the oil-impregnated sintered bearing 8 are rotated may also be adopted.

In addition, other than for a spindle motor to be used for a disk drive, such as an HDD, a fluid dynamic bearing device having incorporated therein the oil-impregnated sintered bearing 8 according to the present invention may also be widely used for a spindle motor to be incorporated in other information equipment, a polygon scanner motor for a laser beam printer, a color wheel for a projector, or any other small-sized motor, such as a fan motor for cooling.

REFERENCE SIGNS LIST

1 fluid dynamic bearing device
2 shaft member
7 housing
8 oil-impregnated sintered bearing
9 sealing member
10 raw material powder
11 partially diffusion-alloyed powder
12 iron powder
16 copper powder
14 elemental copper powder
15 tin powder
18 green compact
28 sintered compact
R1, R2 radial bearing portion
T1, T2 thrust bearing portion
S seal space

The invention claimed is:

1. An oil-impregnated sintered bearing, comprising a copper-iron-based sintered compact containing 40 mass % or more of copper,
wherein the sintered compact has: a copper structure derived from copper powder of partially diffusion-alloyed powder in which copper powder having a particle diameter of 20 µm or less is diffused on and joined to a surface of iron powder in advance; and a copper structure derived from elemental copper powder.

2. The oil-impregnated sintered bearing according to claim 1, wherein the sintered compact contains 35 mass % or more of the copper structure derived from elemental copper powder.

3. The oil-impregnated sintered bearing according to claim 1, wherein the elemental copper powder has a particle diameter of 63 µm or less.

4. The oil-impregnated sintered bearing according to claim 1, wherein the elemental copper powder comprises electrolytic copper powder.

5. The oil-impregnated sintered bearing according to claim 1, wherein the sintered compact comprises a dynamic pressure generating portion on an inner peripheral surface thereof.

6. The oil-impregnated sintered bearing according to claim 1, wherein the sintered compact comprises a dynamic pressure generating portion on an end surface thereof.

7. A fluid dynamic bearing device, comprising:
the oil-impregnated sintered bearing of claim 1;
a shaft member inserted along an inner periphery of the oil-impregnated sintered bearing; and
a radial bearing portion configured to support the shaft member in a non-contact manner in a radial direction with a pressure of an oil film to be generated in a radial bearing gap between an inner peripheral surface of the oil-impregnated sintered bearing and an outer peripheral surface of the shaft member.

8. A motor, comprising:
the fluid dynamic bearing device of claim 7;
a stator coil; and
a rotor magnet.

9. The oil-impregnated sintered bearing according to claim 1,
wherein the elemental copper powder has a particle diameter of 45 μm or less, and
wherein the sintered compact contains 35 mass % or more of the copper structure derived from the elemental copper powder.

10. A method of manufacturing an oil-impregnated sintered bearing comprising a copper-iron-based sintered compact containing 40 mass % or more of copper, the method comprising the steps of:
mixing partially diffusion-alloyed powder in which copper powder having a particle diameter of 20 μm or less is diffused on and joined to a surface of iron powder and elemental copper powder to produce raw material powder;
compression-molding the raw material powder to provide a green compact;
sintering the green compact to provide a sintered compact;
subjecting an inner peripheral surface of the sintered compact to sealing treatment by extending a material of a surface layer on the inner peripheral surface by pressing; and
impregnating inner pores of the sintered compact with an oil.

11. The method of manufacturing an oil-impregnated sintered bearing according to claim 10, wherein the sealing treatment comprises rotation sizing.

12. The method of manufacturing an oil-impregnated sintered bearing according to claim 10, wherein the raw material powder contains 35 mass % or more of the elemental copper powder.

13. The method of manufacturing an oil-impregnated sintered bearing according to claim 10, wherein the elemental copper powder has a particle diameter of 63 μm or less.

14. The method of manufacturing an oil-impregnated sintered bearing according to claim 10, wherein the elemental copper powder comprises electrolytic copper powder.

15. The method of manufacturing an oil-impregnated sintered bearing according to claim 10,
wherein the elemental copper powder has a particle diameter of 45 μm or less, and wherein the raw material powder contains 35 mass % or more of the elemental copper powder.

* * * * *